United States Patent [19]

Clupper et al.

[11] Patent Number: 4,614,970
[45] Date of Patent: Sep. 30, 1986

[54] DESCRAMBLER APPARATUS

[75] Inventors: Charles B. Clupper, Cameron Park; Robert J. Mathews, Fair Oaks, both of Calif.

[73] Assignee: U.S. Computer Systems, Sacramento, Calif.

[21] Appl. No.: 561,054

[22] Filed: Dec. 13, 1983

[51] Int. Cl.⁴ .......................................... H04N 7/167
[52] U.S. Cl. ..................................... 358/120; 358/122
[58] Field of Search ............... 358/117, 120, 122, 123, 358/124

[56] References Cited

U.S. PATENT DOCUMENTS

| 4,222,068 | 9/1980 | Thompson | 358/120 |
|---|---|---|---|
| 4,319,273 | 3/1982 | Nossem | 358/120 |
| 4,333,107 | 6/1982 | McGuire et al. | 358/122 X |
| 4,390,898 | 6/1983 | Bond et al. | 358/120 X |
| 4,511,919 | 4/1985 | Forgey et al. | 358/120 |

Primary Examiner—Stephen C. Buczinski
Assistant Examiner—Linda J. Wallace
Attorney, Agent, or Firm—Phillips, Moore, Lempio & Finley

[57] ABSTRACT

A descrambler apparatus for use with a video transmitter which transmits scrambled video transmission without detectable horizontal or vertical synchronizing pulses but with a descramble signal which occurs at a random time in each frame and which is coded with information indicating the length of time that the signal precedes a fixed preselected point in the transmitted frames. The descrambler apparatus detects the coding of each descramble signal and, after a length of time corresponding to the coding, generates a full frame sequence of horizontal and vertical sync pulses starting at the preselected point in a frame. The generated sync pulses are combined with the received video signals to produce a properly synchronized video signal.

28 Claims, 7 Drawing Figures

DESCRAMBLER APPARATUS

DESCRIPTION

1. Background of the Invention

This invention relates to the reception of video signals. In particular, it relates to the reception and descrambling of intentionally scrambled video signals which have been transmitted from a transmitter such as the head end of a cable television service.

In the cable television environment, the head end transmitter generally makes available to the subscribers a family of programs that are transmitted simultaneously over the cable to the individual subscribers television sets. At an individual customer's television set is a cable interface that enables the subscriber to select the desired channel. Cable television services can simultaneously provide to the subscriber fifty or more channels, each with a discrete program on the channel.

It is common among the cable television services to provide various tiers of service. Each tier of service may include the lower tiers together with one or more additional programs or types of programs. For example, the lowest tier generally includes the local standard channels in the area being covered by the cable service, usually with a community service channel that provides coverage of the local governing bodies and any other community programs considered appropriate.

A higher tier could include an exclusive sports channel, while still another tier could include recently released motion pictures. The customers can subscribe to the lowest tier and one or more of the higher tiers at its option.

In addition, cable television systems have started to provide "pay as you view" service for special events such as world championship boxing matches or the like for which separate charges are made, with individual subscribers who have paid being authorized to receive those televised events. In order to prevent piracy of these televised events the tranmission is scrambled, so that an unauthorized tuner tuning to the channel on which the event is being transmitted will receive only hash.

Typically, scrambling is done at the head end transmitter by removing or obliterating the horizontal and vertical sync pulses so that the television receiver cannot tell when horizontal lines start or when the fields of transmission begins. The image on the screen is thus the same as if the horizontal and vertical controls on the set are adjusted to lose the picture.

In order that an authorized set be able to descramble the transmission a descramble signal is periodically transmitted. The authorized set receives the signal and produces synchronizing signals which are then combined with the transmitted video so that the obliterated synchronizing pulses are restored.

A major problem with the prior art scrambling systems is that the descramble signal occurs at a fixed time in each frame of transmission. Because of the regularity of the descramble signal, pirates have been able to manufacture and sell inexpensive descrambler which enable unauthorized subscribers to descramble the special event transmission without paying for them.

In order to overcome this problem, a scrambling method has been developed wherein the horizontal and vertical synchronizing signals are obliterated as before, but wherein the descramble signal in each frame occurs at a random time, and wherein each descramble signal is individually coded with displacement information indicative of the length of time that such descramble signal precedes a fixed reference point in each frame of transmission.

In addition, the scrambling method also will have individual frames transmitted either normally or in inverted form, depending on the average level of the video signal in the preceding frame, which gives a undecipherable randomness to the inversions. The descramble signals are also individually coded to designate whether the transmitted frame is inverted or not.

SUMMARY OF THE INVENTION

It is an object of the invention to provide a descrambler apparatus which will descramble such scrambled video transmission.

It is a further object of the invention to provide a descrambler apparatus which can be provided by an authorized source to a cable television subscriber at a reasonable cost but which will be very costly to manufacture by a pirate.

In particular, the objects of the invention are achieved in the present invention by providing a descrambler apparatus which has means for receiving the scrambled transmission, a resettable sync generator means for generating a full frame sequence of horizontal and vertical sync pulses in response to each resetting thereof, detection means for detecting the displacemnt coding of the descramble signals, and reset means for resetting the sync pulse generator at a time after the descramble signal corresponding to the displacement coding.

In further accordance with the invention, the descrambler apparatus also has means to detect the coding of the descramble signals which indicate the mode of transmission of the frames, such as normal video transmission or inverted video transmission.

Other objects and advantages of the present invention will become apparent in the course of the following detailed description.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
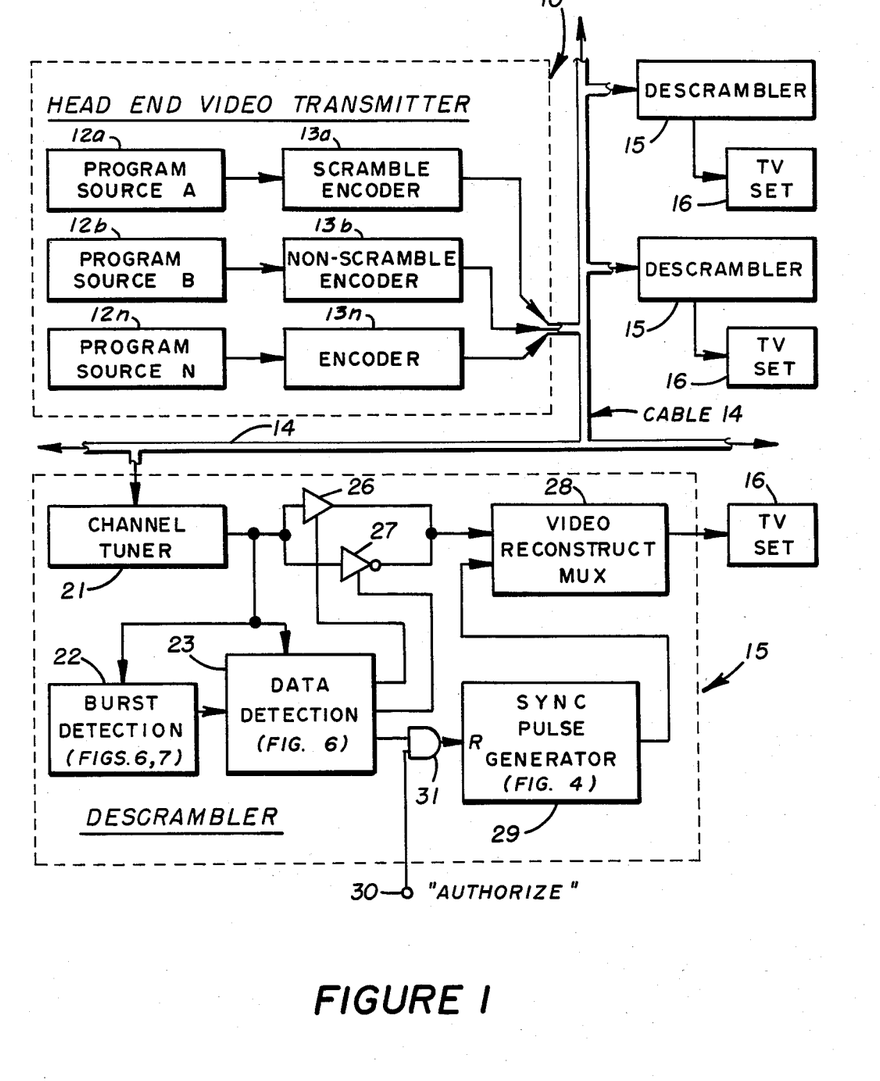
FIG. 1 is a block diagram of a head end video transmitter and of the descramblers used therewith in accordance with the invention.

Referring now to the drawings, which illustrate a preferred embodiment of the invention, FIG. 1 shows a head end video transmitter 10 in which a plurality of program sources 12a, 12b . . . 12n may be separately encoded by encoders 13a, 13b . . . 13n and then transmitted by cable 14 to the various descramblers 15 of the cable subscribers. The descrambler 15 will unscramble scrambled video transmission and/or decode encoded information in the transmission and deliver fully synchronized video transmission to the TV receiving set 16 associated with the particular descrambler apparatus 15.

Figure 2:
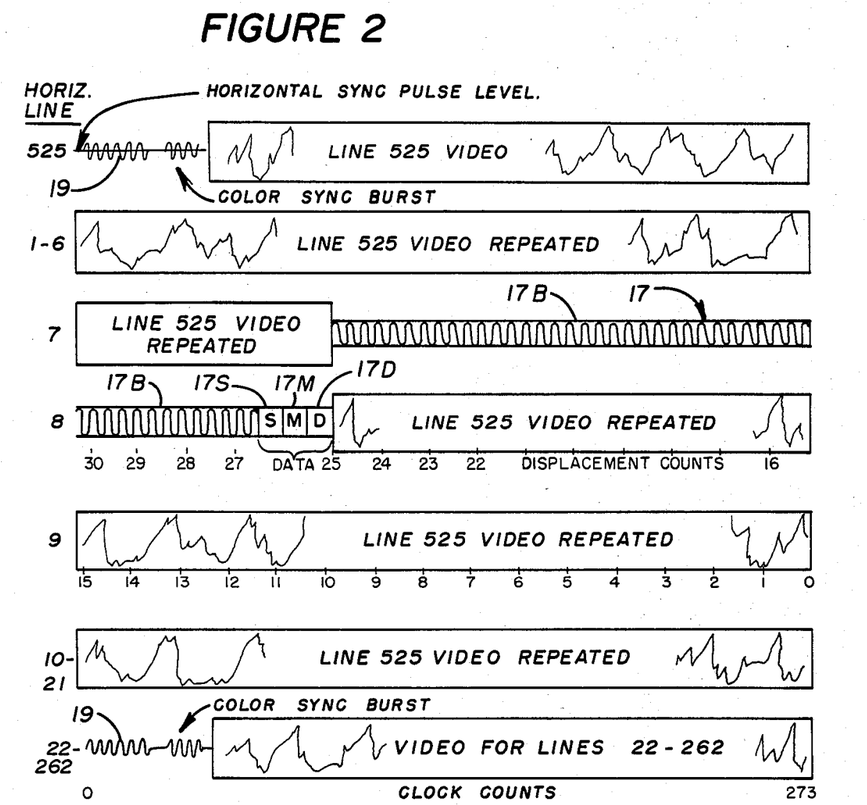
FIG. 2 is a chart illustrating the transmission from the video transmitter which is received by a descrambler apparatus during the first field of a frame of transmission.

In the event that a program source is to be scrambled so that it cannot be received by an unauthorized set, the program source is scrambled and encoded, as by scramble encoder 13a, and then transmitted through the cable 14 to an authorized descrambler 15. When used in conjunction with the descrambler 15 of the present invention, the scramble encoder 13a will function to obliterate all of the horizontal and vertical synchronizing pulses in the program source 12a so that the transmitted frames of video signals will not trigger the horizontal and vertical sweep generators of a TV receiver. The synchronizing pulses may be obliterated by altering their level so that instead of being at a blanking level, they will be in the range of the transmitted video signals. By so doing, the amplitude of the synchronizing signals will be insufficient to trigger the sweep generators. To further scramble the transmission, a video signal may be imposed on the altered levels of the synchronizing pulses during the vertical blanking intervals, i.e. during horizontal lines 1 through 21 and 262½ through 282½. FIG. 2 illustrates the transmission from a scrambler encoder 13a. The first line of FIG. 2 illustrates the last line, line 525, of a full frame of transmission. The normal horizontal synchronizing pulse at the beginning of the line will have its level well within the level range of the video signal. Likewise, the approximately 3.58 MHz color sync burst (if the program source 12a is in color) will be well within the level range of the video signal. As a consequence, the horizontal synchronizing pulse will be buried in, and difficult to distinguish from, the transmitted video portion of the remainder of line 525.

As is seen in the next line of FIG. 2, the video portion of line 525 is repeated over and over again for the first six lines of the vertical blanking interval, so that the equalizing and vertical synchronizing pulses on those lines with their altered levels are buried in the video signal and are effectively obliterated. The video portion of line 525 will likewise be repeated on the remaining lines of the vertical blanking interval, except for the portion of the vertical blanking interval wherein the descramble signal 17 is encoded onto the transmission.

Horizontal lines 22 through 262 will have their horizontal synchronizing pulses masked as in previously discussed line 525. The vertical blanking interval between the two fields of a full frame of transmission, i.e. at horizontal lines 262½ through 282½ will have their synchronizing signals obliterated in the same manner as in the vertical blanking interval of horizontal lines 1 through 21. The second field of the frame, from horizontal line 282½ through line 525, will have their horizontal synchronizing signals obliterated in the same manner as the first field of the frame.

In order that the scrambled transmission may be descrambled, the descramble signal 17 is imposed on the transmission at the head end 10, once during each frame of transmission, and preferably sometime during the first vertical blanking interval. The descramble signal 17 disclosed herein is comprised of a constant frequency portion and a data portion. The constant frequency portion may be a burst 17B of approximately the time duration of one horizontal line of transmission and of a frequency, e.g. 2.15 MHz, which is half that of the clock frequency at the head end transmitter. The data portion of the descramble signal 17 may comprise successive byte signals of which one signal 17S is a synchronizing signal, another signal 17M is a mode signal, and another signal 17D is a mode signal, and another signal 17D is a displacement signal. The synchronizing signal 17S will preferably have the same encoding at all times. The mode signal 17M will have one of a number of preselected codings, depending upon the particular mode of operation. For example, the video portion of the transmission may be further scrambled at the head end transmitter by inverting random frames of video transmission so that the transmission will switch back and forth randomly from normal video to inverted video. The mode signal 17M can have one preselected code if the next frame is normal or a different preselected code of the next frame is inverted. Also, the mode signal 17M can have yet another preselected coding to indicate that the transmission is not scrambled.

Figure 3:
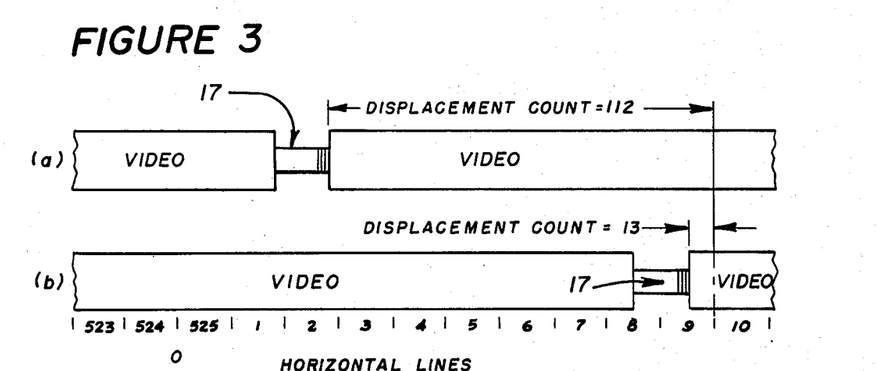
FIGS. 3(a) and 3(b) illustrate the transmission received by a descrambler apparatus during portions of two other frames of transmission.

The descramble signal 17 generated at the head end 10 will be imposed at a random time on each frame of transmission. For example, in the particular frame of transmission illustrated in FIG. 2, the descramble signal 17 starts during horizontal line 7 and ends during line 8. In FIG. 3(a), the displacement signal is shown as starting in line 1 and ending in line 2. Likewise, in the particular frame of transmission shown in FIG. 3(b), the displacement signal starts during line 8 and ends during line 9. The displacement signal 17D will be encoded at the head end with a code indicating the length of time by which the descramble signal precedes a selected point in each frame of transmission. In the particular embodiment shown herein, the selected point in the scrambled mode is taken as the beginning of horizontal line 10 of each frame.

For purposes of illustration, displacement reference points can be considered to exist at equal length periods of time, counting back from the end of line 9. Also for purposes of illustration, each displacement interval may be 18 head end clock pulses in duration. Thus, for the frame of transmission shown in FIG. 2, the displacement signal 17D would be encoded with a code indicating that the descramble signal ends 25 displacement intervals before the end of horizontal line 9. In the frame of transmission illustrated in FIG. 3(a), the displacement signal 17D would be encoded with a code indicating that the beginning of line 10 is 112 displacement intervals after the end of the descramble signal. In FIG. 3(b), the coding of displacement signal 17D would indicate 13 displacement intervals.

A short burst constant frequency sync signal 19 approximately 10 cycles long, of the same frequency as that of the constant frequency portion 17B of descramble signal 17, is imposed on the transmission from the head end 10 during each horizontal synchronizing pulse. These short bursts are used to synchronize the clock in a descrambler 15 with the head end clock.

Referring again to FIG. 1, the transmission from the head end video transmitter 10 will be sent by cable 14 to the descramblers 15 of the various cable subscribers. Each descrambler apparatus 15 includes a channel tuner 21 which enables the subscriber to select a desired cable channel. For purposes of illustration, let it be assumed that tuner 21 is turned to program source 12a, whose transmission is illustrated herein in FIGS. 2, 3(a) and 3(b). The output of tuner 21 is applied to burst detector 22 and data detector 23. If the burst portion 17B of a descramble signal in a frame of transmission is detected, the data detector 23 is enabled, so that the data portions 17M and 17D of the descramble signal can be decoded. If the coding of the mode signal 17M indicates that the video portion of the frame is normal, non-inverting amplifier 26 is enabled. On the other hand, if the coding of the mode signal 17M indicates that the video portion of the frame is inverted, inverting amplifier 27 is enabled. The normal, or normalized video from amplifier 26 or 27 is then delivered to the video reconstruct multiplexer 28.

A resettable sync pulse generator 29 is also connected to the video reconstruct multiplexer 28. The sync pulse generator functions to generate a full frame sequence of horizontal, vertical and equalizing synchronizing pulses for a full 525 horizontal line frame. The sync pulse generator is clocked by a clock in the descrambler. Without unscrambling, the output of the sync pulse generator 29 will be free running and out of synchronization with the video transmission so that a multiplexing combination of the video signals from the transmitter and the synchronizing signals from sync pulse generator 29 will send unintelligible hash to the TV set 16. To descramble the transmission, the data detector 23 will decode the displacement signal 17D of the descramble signal, and, after a length of time depending on the code of that particular signal, will generate a reset signal. If the particular descrambler apparatus 15 has been authorized to receive the scrambled channel, a high "authorize" signal at terminal 30, and on AND gate 31 will enable the reset signal to reset the sync pulse generator 29. The "authorize" signal may be generated as shown in our co-pending application. Ser. No. 561,053, pending, entitled "Data Acquisition Apparatus", filed concurrently herewith, the disclosure of which is incorporated herein by reference.

The sync pulse generator 29 will be reset to the beginning of horizontal line 10 of its full frame sequence of pulses at the same time that the transmission from the head end transmitter is at the beginning of line 10. The sync pulse generator 29 will then cycle through a full frame sequence of synchronizing pulses, ending at the end of line 9 of the next frame. At that time, the sync pulse generator 29 will be reset for another full frame sequence by the reset signal generated in response to the next descramble signal 17.

The output from the sync pulse generator 29, which is now in synchronization with the transmission from the head end transmitter 10, is combined with the video portion in multiplexer 18, so that the output to TV set 16 is a properly synchronized video transmission which the TV receiver 16 will then display in descrambled form.

Figure 4:
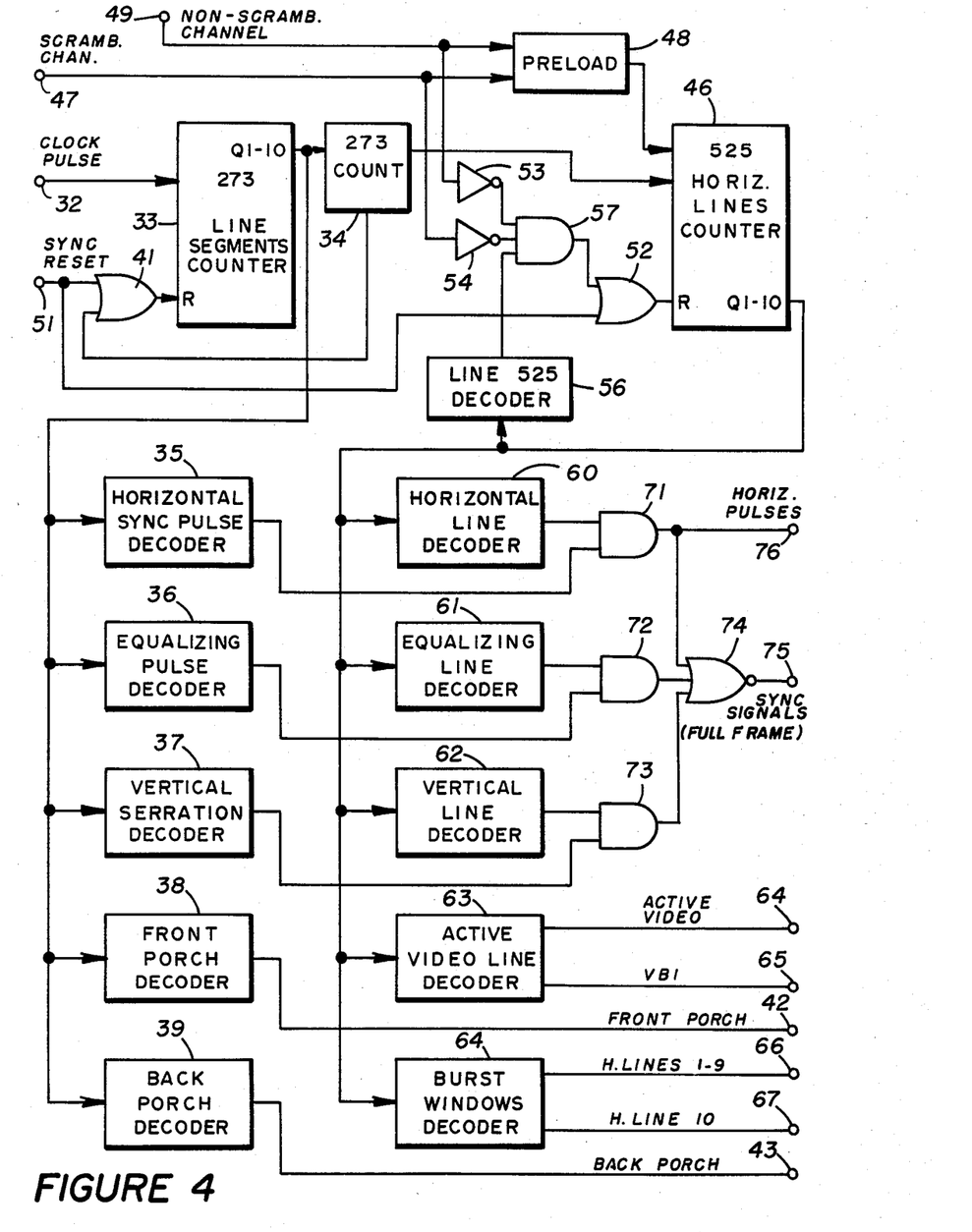
FIG. 4 is a block diagram of the resettable sync pulse generator of one of the descramblers of FIG. 1.

More specific details of the sync pulse generator 29 are shown in FIG. 4. Descrambler clock pulses at terminal 32, generated at the rate of approximately 4.3 MHz are applied to the input of line segment counter 33. This counter will give full and half counts of the clock pulses and the appropriate Q1–10 outputs of the counter 33 are applied to the 273-count decoder 34, the horizontal sync pulse decoder 35, the equalizing pulse decoder 36, the vertical serration pulse decoder 37, the front porch decoder 38 and back porch decoder 39. These various decoders will have a high output for one or more of the counts of the clock pulses applied to counter 33. Two hundred and seventy three clock pulses will be generated for each horizontal line of a transmitted frame. Accordingly, when 273 clock pulses have been counted, the 273-count decoder 34 will pulse, through OR gate 41, to reset the line segments counter 33.

The horizontal synch pulse decoder 35 will have a high output during line segment counts 6 through 27, the equalizing pulse decoder 36 will have a high output during line segment counts 6–17 and 142.5–153.5, and the vertical serration decoder 37 will have a high output during line segment counts 6–123.5 and 142.5–259.5. The front porch decoder 38 will have a high output on terminal 42 during line segment counts 2 and 3 and the back porch decoder terminal 43 will go high during line segments 40 and 41.

When line segment counter 33 has counted a full 273 clock pulses, the 273-count decoder 34 will output a pulse to the 525 horizontal lines counter 46, which will count the horizontal lines for a full frame of transmission. If the transmission is in scrambled mode, there will be a signal on the "scrambled channel" terminal 47 which will cause the preload circuit 48 to load a count of ten into line counter 46 when it is reset. With such a preload, line counter 46 will count 525 times before resetting, with the last nine counts being decoded as lines one through nine. If the transmission is in non-scrambled mode, the signal on terminal 49 will cause preload 48 to load a count of eleven into the line counter 46 when it is reset. With this preload, line counter will begin counting from the beginning of line 11, and the last ten counts of the 525 line cycle will be decoded as lines one through 10.

When in either the scrambled mode or non-scrambled mode, line counter 46 will be reset by a sync reset signal on terminal 51, acting through OR gate 52. If there is neither a scrambled channel signal on terminal 47 nor a non-scrambled channel signal on terminal 49, the outputs of inverters 53 and 54 will both be high so that a pulse from the line 525 decoder 56 can act through AND gate 57 or OR gate 52 to reset line counter 46 back to one.

The appropriate Q1–10 outputs of horizontal lines counter 42 are also connected to the various decoders 60–64. The horizontal line decoder 60 will go high during lines 10–262 and 272–525, the equalizing line decoder 61 will go high during lines 1–3, 7–9, 262–265 and 268–271, and the vertical line decoder 62 will go high during lines 4–6 and 265–268. The active video line decoder 63 will output a high to the active video terminal 64 during lines 22 through 525 and a high to the vertical blanking interval, VBI, terminal 65 at the end of line 21. The burst window decoder 64 will output a high to terminal 66 during horizontal lines 1–9, and a high to terminal 67 during horizontal line 10.

Figure 5:
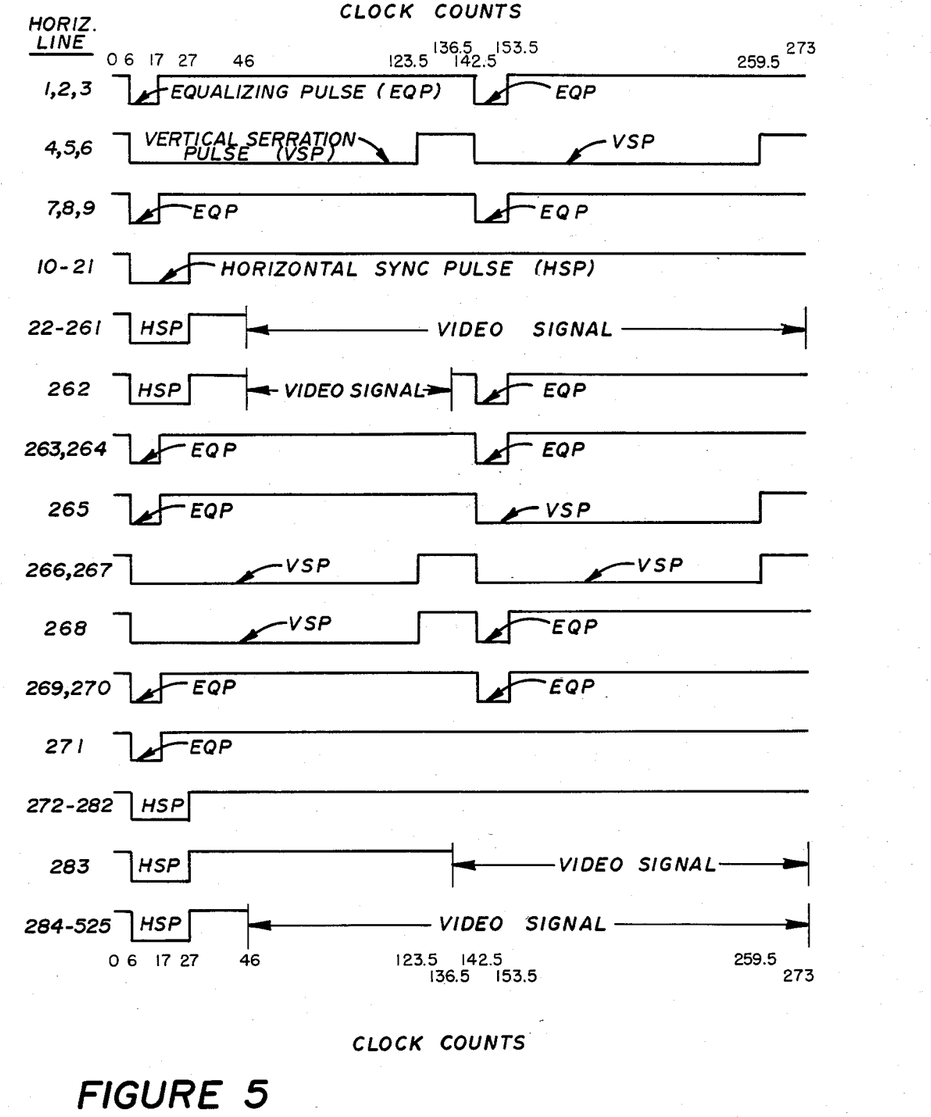
FIG. 5 is a chart illustrating a full frame sequence of the horizontal and vertical synchronizing pulses generated by the resettable sync pulse generator of FIGS. 1 and 4.

AND gates 71, 72 and 73 and NOR gate 74 will combine the outputs of the horizontal, equalizing and vertical decoders 35, 36, 37, 60, 61 and 62 to produce a full frame sequence of negatively going horizontal, equalizing and vertical synchronizing pulses, at terminal 75, such pulses being illustrated as FIG. 5. The horizontal pulses illustrated on FIG. 5 are also present, in noninverted form at terminal 76. These signals at terminal 75, together with the front porch and back porch signals at terminals 42 and 43 are sent to the video reconstruct multiplexer 28. The front porch and back porch signals are used in setting the synchronizing signals to the proper blanking level. The resulting full frame sequence of synchronizing pulses is in full accordance with FCC requirements and is fully compatible with standard 525 line television receivers.

Figure 6:
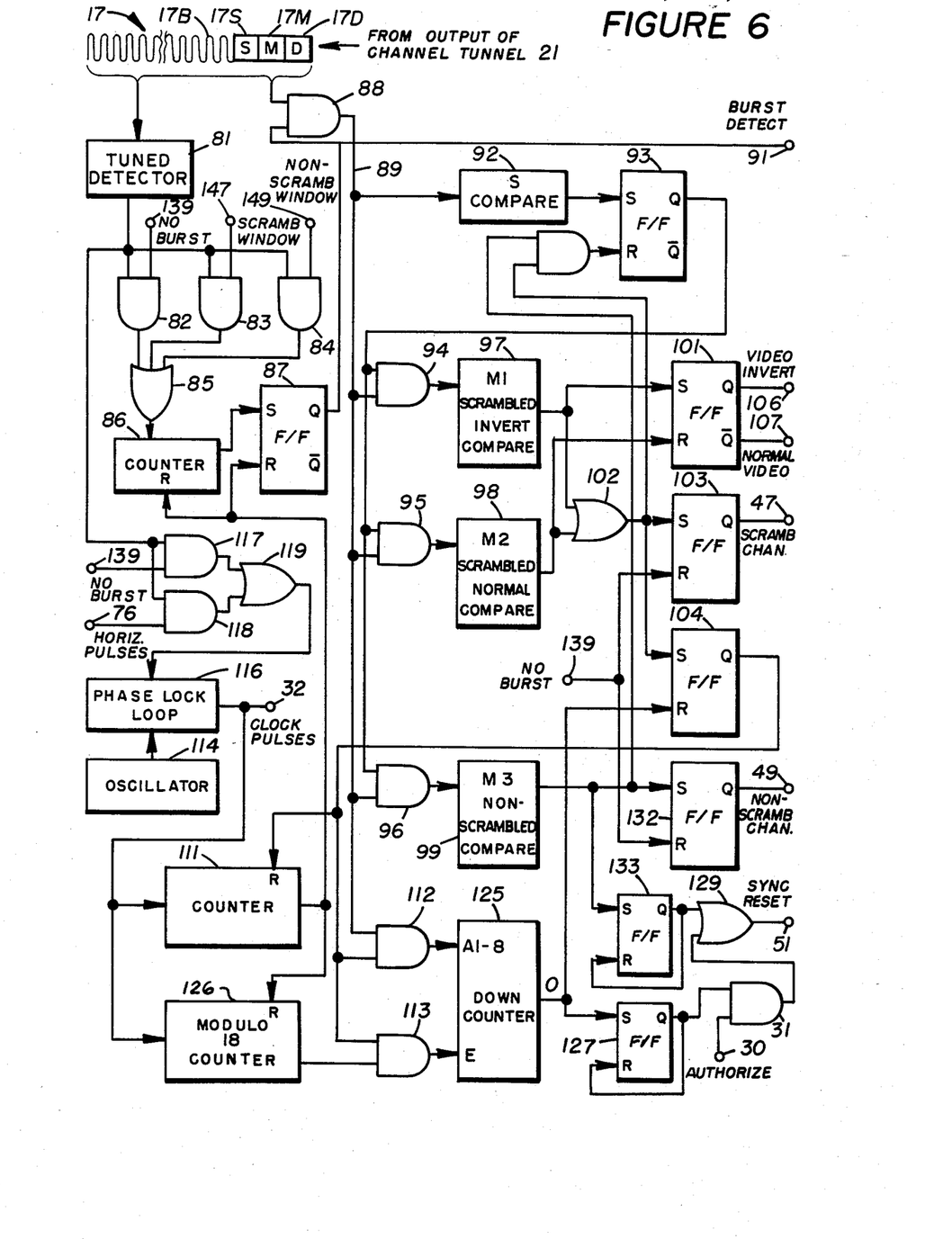
FIG. 6 is a block diagram of the burst and data detection portions of the descrambler apparatus of FIG. 1.

Turning now to FIG. 6, the output from channel tuner 21 is applied to tuned detector 81, which is a high-Q tuner tuned to the 2.15 MHz frequency of the constant frequency burst portion 17B of the descramble signal 17. When a descramble signal is present, the detector 81 will deliver a series of pulses through one and the AND gates 82, 83, 84 and the OR gate 85 to counter 86 for as long as the burst portion 17B lasts. To prevent against triggering by random signals having the same frequency, the counter 86 will count a predetermined number of pulses. For example, with approximately 130 cycles of the burst signal in a descramable signal, the counter 86 may have to count 64 pulses before its ouput will go high. When it does, it will set flip-flop 87 so that its high Q output will be applied to AND gate 88 to enable it to pass high signals from the received transmission to data bus 89. The Q output of flip-flop 87 will also be present on terminal 91 as a "burst detect" signal.

With AND gate 88 enabled, the descramble signal 17 can now pass through to comparator 92. Comparator 92 functions to compare the data entered thereinto from gate 88 with a fixed digital code which is the same code as is used at the head end transmitter 10 for the descramble signal 17S. For purposes of illustration, this can be an eight bit byte. In due course, after the burst portion 17B of the descramble signal ends, the full 17S byte will be present in comparator 92, and will match the fixed byte in the comparator. When this occurs, the output of comparator 92 will go high to set flip-flop 93. The Q output will go high to enable AND gates 94, 95 and 96 so that the mode signal 17M, which is next in time, and which is another eight bit byte, can enter into comparators 97, 98 and 99. These comparators also function to compare the entered byte with the preselected byte codes for the scrambled inverted transmission mode, the scrambled normal transmission mode, or the non-scrambled transmission mode, respectively.

If the mode signal 17M indicates that the transmission is scrambled and that the video portion of the frame will be inverted, the mode signal 17M will be the same as the fixed byte in comparator 97, and its output will go high to set flip-flop 101 and, through OR gate 102, to set flip-flops 103 and 104. Setting of flip-flop 101 will cause its Q output to produce a high "video invert" signal on terminal 106. In FIG. 1, this signal will be applied to inverting amplifier 27 so that the inverted video signal in the frame of transmission will be re-inverted to normal and passed to the video reconstruct multiplexor 28.

If the mode signal 17M has, instead, a code indicating that the transmission is scrambled and that the video portion of the frame is not inverted, the mode signal will be the same as the fixed byte in comparator 98 and its output will go high. This output will reset flip-flop 101 so that its Q output will produce a high "normal video" signal on terminal 107. This signal will, on FIG. 1, enable the non-inverting amplifier 26, so that the video signal will be delivered, without inversion, to the video reconstruct multiplexer 28. The high output of comparator 98 will also, through OR gate 102 set flip-flops 103 and 104 in the same way that they would be set by comparator 97 if the mode signal 17M had been coded for scrambled and inverted transmission. Setting of flip-flop 103 will output a high to terminal 147 to provide a signal "scrambled channel" indicating that the transmission is in a scrambled mode.

Setting of flip-flop 104 will occur at the end of the mode signal 17M, and the now-high Q output will reset counter 111, and enable AND gates 112 and 113.

Referring to the left hand portion of FIG. 6, the descrambler apparatus has a crystal driven oscillator 141 of the same frequency as the clock in the head end transmitter 10, i.e. approximately 4.3 MHz. The output of oscillator 114 is applied to phase lock loop circuit 116. In addition, the output of tuned detector 81 is applied through AND gates 117 or 118 and OR gate 119 to the phase lock loop 116. The phase lock loop 116 will lock the frequency of oscillator 114 to the constant frequency burst signal 17B from the head end transmitter 10 so that the clock pulses on clock bus 121 of the descrambler 15 will be in synchronization with the clock pulses at the head end transmitter. For purposes of simplicity, the clock bus 121 has not been shown as connected to the various counters, flip-flops and comparators described herein. However, it is to be understood that the counters, flip-flop and comparator herein are clocked by the clock pulses in a conventional manner for synchronized handling of digital data.

Returning now to the description of operation, with AND gate 112 enabled by flip-flop 104, the coded data of the displacement signal 17D will enter, bit by bit, through AND gate 112 and into the down counter 125. At the same time, the reset counter 111 will be counting clock pulses. At the ninth clock pulse, i.e. at the end of the displacement signal 17D, the output of counter 111 will go high to reset flip-flop 87 so that no more data can pass through AND gate 88 to data line 89. The full byte of the displacement code is now set in down counter 125. If the descramble signal had occurred at the time illustrated in FIG. 2, a coding corresponding to the number "25" would be entered into the down counter 125.

The high output from counter 111 also resets the modulo 18 counter 126 which will then begin to count clock pulses and to output a decrementing pulse every 18th clock pulse. As previously noted, the displacement lengths on FIG. 12 are each 18 clock pulses long. The decrementing pulses from modulo counter 126 will be applied through AND gate 113 to the enable input of the down counter 125, which then causes the count in the down counter to decrement. In the present example, decrementing pulses from module counter 126 will cause the count in down counter 125 to decrement to zero, causing its output to go high. This output will reset flip-flop 104. It also sets flip-flop 127, whose Q output goes high for one clock pulse before the flip-flop resets. The output pulse passes through the "authorize" AND gate 31 and OR gate 129 so that the sync reset terminal 51 goes high. The "authorize" gate 31 will be enabled by a high "authorize" signal on input terminal 30. This signal comes from a suitable source authorizing this particular descrambler 15 to descramble the transmission. If this particular apparatus is not so authorized, the lack of a high signal on terminal 131 will prevent the apparatus from generating a "sync reset" pulse from down counter 125.

By virtue of the down counting in counter 125, the "sync reset" signal from flip-flop 127 will occur at the end of the ninth horizontal line of transmission. This sync reset signal is then used, on FIG. 4, to reset the horizontal line segments counter 33 and the horizontal lines counter 46. Since flip-flop 103 (FIG. 6), is set, the "scramble channel" signal is at terminal 47, so that (FIG. 4) the horizontal line counter is preloaded start counting at the beginning of line 10.

By like manner, if the descramble signal of FIG. 3(a) had been received, the displacement signal 17D would load the number "112" into the down counter 125, and 112 decrementing pulses would be required from the modulo counter 126 to decrement down counter 125 to zero. Again, this would occur at the end of line 9 of the transmission so that the "sync reset" pulse would reset the sync generator to begin its full frame sequence, starting again at the beginning of line 10.

Thus, even through the position of the descramble signal 17 will vary from frame to frame, the "sync reset" pulse will cause the resettable sync generator 29 to start at line 10 at exactly the same time that the beginning of line 10 of the transmitted frame is received by the descrambler 15. As a consequence, the sync pulse generator output delivered to the video reconstruct video multiplexer 28 will be exactly in synchronization with the video portion so that an accurately descrambled transmission can be outputted to the TV set 16.

At times, the transmission from the head end transmitter may be in a non-scrambled mode, but with a descramble signal being used to synchronize the resettable sync pulse generator 29 with the transmission from the head end transmitter. In such case, the descramble signal 17 is imposed on the transmission during line 10 of each frame, with the mode signal 17M being coded for the non-scramble mode and ending at the end of line 1D.

As before, the burst portion 17B of the descramble signal will be detected, flip-flop 87 will enable AND gate 88 and the sync signal 17S will cause flipflop 93 to set, thereby enabling AND gates 94, 95 and 96. The mode signal 17M will be applied to the three mode signal comparators 97, 98 and 99, and this time will cause the output of comparator 99 to go high to set flip-flop 132 so that a high signal is outputted to "non-scrambled channel" terminal 49. The output of comparator 99 also sets flip-flop 133 to output a "sync reset" pulse through OR gate 129 to sync reset terminal 51. The signals at terminals 49 and 51 are used, on FIG. 4 to reset the sync pulse generator with a preload of ten so that it begins a full frame sequence of synchronizing pulses beginning at the start of line 11, and in synchronization with the received transmission.

Figure 7:
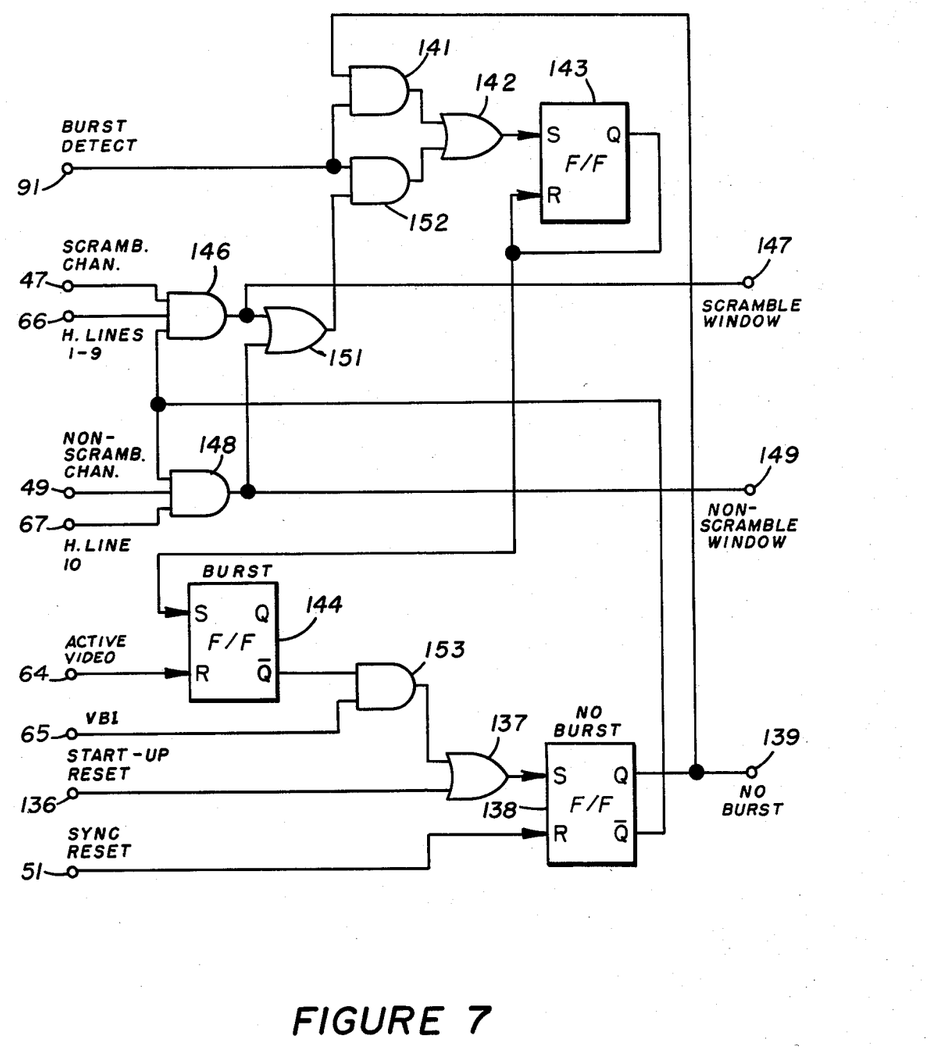
FIG. 7 is a block diagram of the burst window logic portion of the descrambler apparatus.

The logic portion of the descrambler apparatus 15 which controls the windows through which the burst frequency portion 17B of the descramble signal 17 and the short bursts 19 pass to counter 86 and phase lock loop 116 are shown in FIG. 7.

During initial start-up, when power is applied to the descrambler 15, a "start-up reset" signal on terminal 136 will, through OR gate 137, set the "no burst" flip-flop 138, causing the "no burst" terminal 139 to go high and causing AND gate 141 to be enabled. The "no burst" flip-flop 138 will remain set until after a descramble signal is detected. As is seen on FIG. 6, the no burst signal on terminal 139 will enable AND gates 82 and 117. Additionally, a "no burst" signal on terminal 139 will rest flip-flops 103 and 132 so that neither the "scrambled channel" terminal 47 nor the "non-scrambled channel" terminal 49 will have a high signal thereon.

In due course a descramble signal 17 will be received, and the tuned detector 81 will output pulses at the burst frequency. Since the AND gate 82 is enabled, these pulses can pass therethrough to counter 86, regardless of the degree that the sync pulse generator 29 of the descrambler apparatus is out of synchronization with the received transmission. Once a sufficient number of the burst frequency pulses have been counted, a "burst detect" signal will appear at terminal 91. Also, since AND gate 117 is enabled by the no burst signal on terminal 139, the burst frequency pulses will pass through to the phase lock loop 116 to synchronize the descrambler clock with the clock.

Returning to FIG. 7, the high "burst detect" signal on terminal 91 will pass through AND gate 141 and OR gate 142 to set flip-flop 143. This flip-flop with output a single pulse which sets the "burst" flip-flop 144.

In due course, a "sync reset" signal will be generated, as previously described, in response to the pulse from "scramble" flip-flop 127 or "non-scramble" flip-flop 133. This "sync reset" signal on terminal 51 will reset the "no burst" flip-flop 138 so that its Q and $\overline{Q}$ outputs go low and high, respectively.

At the end of the vertical blanking interval in which flip-flop 144 is set, the "VBI" signal on terminal 65 will be generated. Since the Q output of flip-flop 144 is low, the "active video" signal cannot set the "no burst" flip-flop 138. One clock pulse later, after the "VBI" signal, the "active video" signal on terminal 64 will reset the "burst" flip-flop 144. The Q output will go high, but since the "VBI" signal is no longer present, the "no burst" flip-flop 138 will not set.

Thus, with the "no burst" flip-flop 138 reset, and with the Q output of the "no burst" flip-flop 138 now high, AND gate 146 will output a high during horizontal lines 1-9 if the detected descramble signal had a mode signal 17M indicating a scrambled mode. The high output of AND gate 146 will appear at scramble window terminal 147, and, on FIG. 6, will enable AND gate 83. Similarly AND gate 148, FIG. 7, will output a high "non-scramble" signal to terminal 149 during horizontal line 10 if the mode signal 17M indicated that the transmission was in non-scrambled mode. The non-scramble window signal on terminal 149 will, on FIG. 6, enable the AND gate 84.

As is apparent, AND gate 83 will function as a descramble window so that the burst detector will only respond to burst frequency signals occurring during horizontal lines 1-9, i.e. during part of the vertical blanking interval. As a consequence, if a sustained signal at the burst frequency should be present in the transmitted video portion, such signal cannot actuate the burst detector. Likewise, AND gate 84 will function as a descrambler window for restricting detection of descramble signals to such signal as will occur during horizontal line 10.

If the transmission is in the scrambled mode, AND gate 146 will enable AND gate 152 during horizontal lines 1-9 of the next frame of transmission. If a descramble signal is present sometime during those lines, tuned detector 81 will output through the scrambled window AND gate 83 (FIG. 6), and a "burst detect" signal will be generated at terminal 91. On FIG. 7, this signal will pass through enabled AND gate 152 and OR gate 142 to set flip-flop 143, which pulses once to set the "burst" flip-flop 144, as before. Likewise, if the transmission is in the non-scrambled mode, a descramble signal during horizontal line 10 of the next frame of transmission will pass through the non-scrambled descramble window (AND gate 84) and the "burst detect" signal at terminal 97 will set flip-flop 143 to set the "burst" flip-flop 144.

However, if the transmission is in scrambled mode and a descramble signal is not detected in the first nine lines of the next frame (or if the transmission is in non-scrambled mode and a descramble signal is not detected during line ten of the next frame), a "no burst" detect signal will appear at terminal 91 and flip-flop 143 will be be set. Likewise, the "burst" flip-flop 144 will not be set, so that its Q output remains high. Shortly after, at the end of the vertical blanking interval, the "VBI" signal on terminal 65 will go high. AND gate 153 will output a high through OR gate 137 to set the "no burst" flip-flop 138.

With flip-flop 138 again set, AND gate 82 (FIG. 6) will be enabled so that any subsequent descramble siganal at any time in relation to the operation of the sync pulse generator 29, will cause a "burst detect" signal to appear at terminal 91, which can pass through enabled AND gate 141 (FIG. 7) to set flip-flops 143 and 144, with the subsequent "sync reset" signal causing the "no burst" flip-flop 138 to reset, as previously described.

The "no burst" signal on terminal 139 is also used to enable AND gate 117 (FIG. 6) so that any initial detection of the burst portion 17B of the descramble signal will cause such detection to be appled to the phase lock loop circuit 116 to synchronize the clock pulses of the descrambler apparatus with the clock of the head end transmitter. After the sync pulse generator has been reset, from the down-counter 125 or the non-scrambled comparator 99, the horizontal pulses on terminal 76 will enable the sync window (AND gate 118) to the phase lock loop 116 during the times that the head end transmitter 10 is imposing the short burst 19 on the transmission. These short bursts, occurring repeatedly throughout a frame of transmission, will keep the descrambler pulse generation synchronized with the head end clock. Subsequently, if a descramble signal is not detected when it should be, the "no burst" signal in terminal 139 will again enable AND gate 117 so that the next descrambler signal 17 which is detected can be used to synchronize the descrambler and head end clocks.

The foregoing description of a preferred embodiment has been presented for purposes of illustration and description. It is not intended to be exhaustive or to limit the invention to the precise form described, and obviously many modifications and variations are possible in light of the above teaching. The embodiment shown was shown and described in order to best explain the principles of the invention and its practical applications to hereby enable others in the art to best utilize the invention in various embodiments and with various modifications as are suited to the particular use contemplated. It is intended that the scope of the invention be defined by the claims appended hereto.

We claim:

1. A descrambler apparatus for use with a video transmitter which transmits frames of video signals with scrambled horizontal and vertical synchronizing pulses and with variably coded descramble signals, there being one descramble signal in each frame of transmission, in which the coding of each of said descramble signals varies with the length of time that the descramble signal precedes a predetermined point in the frame, said descrambler apparatus comprising:

receiving means for receiving said transmitted frames of video signals, a resettable sync generator means for generating a full frame sequence of horizontal and vertical synchronizing pulses in response to each resetting thereof, detection means for detecting the codings of the variably coded descramble signals received by said receiving means, reset means for resetting said sync generator means after each detection of a descramble signal with the time interval between the detection of said descramble signal and the setting of said sync generator corresponding to the time coding of said descramble signal, means for combining the full frame sequences of horizontal and vertical synchronizing pulses from said resettable sync generator means with the frames of transmitted video signals received by said receiving means.

2. A descrambler apparatus as set forth in claim 1, and in which said video transmitter also transmits a constant frequency sync signal during the times that the horizontal synchronizing pulses are scrambled, and in which the timing of said synchronizing pulses of said resettable sync generator means is controlled by clock pulses applied thereto, said descrambler apparatus further including:

a tuned detector tuned to the frequency of said constant frequency sync signals, an oscillator means for generating clock pulses, means for applying said clock pulses to said resettable sync generator, phase lock loop means connected to said oscillator means and said tuned detector for synchronizing the frequency of operation of said oscillator means with the frequency of said constant frequency signals.

3. A descrambler apparatus as set forth in claim 2, and further including:

sync window means for preventing said phase lock loop means from responding to transmitted signals other than signals received during the times that synchronizing pulses are generated by said resettable sync generator means.

4. A descrambler apparatus as set forth in claim 1, and in which said video transmitter also transmits a constant frequency descrambler signal in each frame of transmission, said constant frequency descramble signals each having a duration at least as long as a predetermined number of cycles of said constant frequency, said descrambler apparatus further including:

a tuned detector tuned to the frequency of said constant frequency descramble signals, enabling means for enabling said detection means to detect the coding of the variably coded descramble signal in a frame of transmission in response to a detection of said predetermined number of cycles of said constant frequency descramble signal by said tuned detector during said frame of transmission.

5. A descrambler apparatus as set forth in claim 4, and in which said video transmitter transmits said descramble signal only at some time during preselected lines of said frames of transmission, said descrambler apparatus further comprising:

means for enabling said detection means to detect the presence of a first descramble signal occuring at any time during operation of said resettable sync generator means, descramble window means for restricting detection of descramble signals to such scramble signals as occur during said preselected lines of the frame sequence of synchronizing pulses generated by said resettable sync generator means, means for enabling said descramble window means in response to the detection of said first descramble signal.

6. A descrambler apparatus as set forth in claim 5 and further including:

means for re-enabling said detection means to detect the presence of a descramble signal occurring at any time during operation of said resettable sync generator means in the event that a descramble signal is not detected during the time that said descramble window means is enabled.

7. A descrambler apparatus as set forth in claim 4, and in which said video transmitter also transmits a constant frequency sync signal during the times that the horizontal synchronizing pulses are scrambled, said sync signals having the same frequency as the frequency of said constant frequency descramble signals, and in which the timing of said synchronizing pulses of said resettable sync generator means is controlled by clock pulses applied thereto, said descrambler apparatus further including:

a tuned detector tuned to the frequency of said constant frequency sync signals, an oscillator means for generating clock pulses, means for applying said clock pulses to said resettable sync generator, phase lock loop means connected to said oscillator means and said tuner detector for synchronizing the frequency of operation of said oscillator means with the frequency of said constant frequency sync signals.

8. A descrambler apparatus as set forth in claim 7, and in which said video transmitter transmits said descramble signal only at some time during preselected lines of said frames of transmission, said descrambler apparatus further comprising:

means for enabling said detection means to detect the presence of a first descramble signal occurring at any time during operation of said resettable sync generator means, descramble window means for restricting detection for descramble signals to such descramble signals as occur during said preselected lines of the frame sequence of synchronizing pulses generated by said resettable sync generator means, means for enabling said descramble window means in response to the detection of said first descramble signal.

9. A descrambler apparatus set forth in claim 7, and further including:

sync window means for preventing said phase lock loop means from responding to transmitted signals other than signals received during the times that syncrhonizing pulses are generated by said resettable sync generator means.

10. A descrambler apparatus as set forth in claim 9, and in which said video transmitter transmits said descramble signal only at some time during preselected lines of said frames of transmission, said descrambler apparatus further comprising:

means for enabling said detection means to detect the presence of a first descramble signal occurring at any time during operation of said resettable sync generator means, descramble window means for restricting detection of descramble signals to such descramble signals apparatus as occur during said preselected lines of the frame sequence of synchronizing pulses generated by said resettable sync generator means, means for enabling said descramble window means in response to the detection of said first descramble signal.

11. A descrambler apparatus as set forth in claim 1, and in which said video transitter also transmits a fixedly coded descramble signal in each frame of transmission and in which the coding of said fixedly coded descramble signal remains constant from frame to frame during a determinable duration of transmission, and in which the detection means of said descramble apparatus has the further function of detecting the presence of said fixedly coded descramble signals, and wherein said descrambler apparatus further includes enabling means responsive to the detection of a fixedly coded descramble signal for enabling said detection means in a frame of transmission to detect the coding of the variably coded descramble signal in said frame of transmission.

12. A descrambler apparatus as set forth in claim 11, and in which said video transmitter also transmits a mode signal during each frame of transmission, each mode signal being coded with one of a predetermined number of codes and coded in accordance with a desired mode of operation during the frame of transmission, and in which the detection means of said descramble apparatus has the further function of detecting the coding of said mode signals, and wherein said descrambler apparatus further includes:

second enabling means responsive to the detection of a fixedly coded descramble signal in a frame of transmission for enabling said detection means to detect the coding of said mode signal in said frame of transmission.

13. A descrambler apparatus as set forth in claim 12 and further including:

means for inverting the received video portion of a frame of transmission in response to the detection by said detection means of a first predetermined coding of the mode signal associated with that frame of transmission, means for passing the received video portion of a frame of transmission in response to the detection by said detection means of a second and different predetermined coding of the mode signal associated with that frame of transmission.

14. A descrambler apparatus as set forth in claim 11, and in which said video transmitter also transmits a constant frequency descramble signal in each frame of transmission, said constant frequency descramble signals each having a duration at least as long as a predetermined number of cycles of said constant frequency, said descrambler apparatus further including:

a tuned detector tuned to the frequency of said constant frequency descramble signals, second enabling means for enabling said detection means to detect the presence of the fixedly coded descramble signal in a frame of transmission in response to a detection of said predetermined number of cycles of said constant frequency descramble signal by said tuned detector during said frame of transmission.

15. A descrambler apparatus as set forth in claim 14, and in which said video transmitter transmits said descramble signal only at some time during preselected lines of said frames of transmission, said descrambler apparatus further comprising:

means for enabling said detection means to detect the presence of a first descramble signal occurring at any time during operation of said resettable sync generator means, descramble window means for restricting detection of descramble signals to such scramble signals as occur during said preselected lines of the frame sequence of synchronizing pulses generated by said resettable sync generator means, means for enabling said descramble window means in response to the detection of a descramble signal occurring at any time during operation of said resettable sync generator means.

16. A descrambler apparatus as set forth in claim 15 and further including:

means for re-enabling said detection means to detect the presence of a descramble signal occurring at any time during operation of said resettable sync generator means in the event that a descramble signal is not detected during the time that said descramble window means is enabled.

17. A descrambler apparatus as set forth in claim 14, and in which said video transmitter also transmits a mode signal during each frame of transmission, each mode signal being coded with one of a predetermined number of codes and coded in accordance with a desired mode of operation during the frame of transmission, and in which the detection means of said descramble apparatus has the further function of detecting the coding of said mode signals, and wherein said descrambler apparatus further includes:

third enabling means responsive to the detection of a fixedly coded descramble signal in a frame of transmission for enabling said detection means to detect the coding of said mode signal in said frame of transmission.

18. A descrambler apparatus as set forth in claim 17, and further including:

means for inverting the received video portion of a frame of transmission in response to the detection by said detection means of a first predetermined coding of the mode signal associated with that frame of transmission, means for passing the received video portion of a frame of transmission in response to the detection by said detection means of a second and different predetermined coding of the mode signal associated with that frame of transmission.

19. The method of descrambling video transmission which has no detectable horizontal or vertical synchronizing pulses but which has a descramble signal at a random time in each frame with the descramble signal in each frame having a displacement coding indicative of the length of time by which the descramble signal precedes a fixed reference point in the frames of transmission, the method comprising:

(a) detecting the displacement coding of a descramble signal, (b) waiting for a length of time dependent upon the particular displacement coding of said descramble signal, (c) then generating a full frame sequence of horizontal and vertical synchronizing pulses, beginning at said fixed reference point in said frames, (d) continuously repeating steps (a), (b), and (c) with successive descramble signals, (e) combining the frames of video transmission with the synchronizing pulses generated in step (c).

20. The method of descrambling video transmission as set forth in claim 19, wherein each of the descramble signals also has a mode coding indication of the mode of transmission of the frame in which the descramble signal occurs, the method further comprising:

detecting the mode coding of each descramble signal.

21. The method of descrambling video transmission as set forth in claim 19 wherein each of the descrambler signals also has a mode coding indicative of whether or not the video portion of the frame in which the descramble signal occurs is in inverted mode, the method further comprising:

detecting the mode coding of each descramble signal,
re-inverting those frames of transmission in which the mode coding of the descramble signal in the frame indicates that the video portion of the frame is in inverted mode.

22. The method of descrambling video transmission as set forth in claim 19, wherein the descramble signals each have a burst of constant frequency lasting for at least a predetermined number of cycles, the method further comprising:

detecting the presence in each burst of constant frequency, counting the number of cycles in each burst, detecting the displacement coding of a descramble signal only if the counted number of cycles of the burst portion of that descramble signal is at least as great as said predetermined number.

23. The method of descrambling video transmission as set forth in claim 22, wherein each of the descramble signals also has a mode coding indication of the mode of transmission of the frame in which the descramble signal occurs, the method further comprising:

detecting the mode coding of each descramble signal.

24. The method of descrambling video transmission as set forth in claim 22, wherein each of the descrambler signals also has a mode coding indicative of whether or not the video portion of the frame in which the descramble signal occurs is in inverted mode, the method further comprising:

detecting the mode coding of each descramble signal,
re-inverting those frames of transmission in which the mode coding of the descramble signal in the frame indicates that the video portion of the frame is in inverted mode.

25. The method of descrambling video transmission as set forth in claim 22, the method further comprising:

synchronizing the generation of said full frame sequence of horizontal and vertical synchronizing pulses with the frequency of said constant frequency portion of said transmission.

26. The method of descrambling video transmission as set forth in claim 25, wherein said descramble signal occurs only within predetermined lines of a frame of transmission, the method further comprising:

after a first descramble signal has been detected and a full frame sequence of horizontal and vertical synchronizing pulses has begun to be generated, then restricting the detection of the next descramble signal to an occurrence thereof during predetermined lines at the end of said full frame of said synchronizing pulses.

27. The method of descrambling video transmission as set forth in claim 25, wherein the transmission has a short burst of said constant frequency occurring during times that horizontal sync pulses should occur during a frame of transmission, the method further comprising:
  detecting said short bursts of constant frequency,
  periodically synchronizing the generation of said full frame sequence of horizontal and vertical synchronizing pulses with the frequency of said short bursts.

28. The method of descrambling video transmission as set forth in claim 27, the method further comprising:
  after a first descramble signal has been delivered and a full frame sequence of horizontal and vertical synchronizing pulses has begun to be generated, then restricting the detection of said short bursts to such times as said synchronizing pulses in said frame are being generated.

* * * * *